(12) United States Patent
Taniguchi et al.

(10) Patent No.: US 7,079,174 B2
(45) Date of Patent: Jul. 18, 2006

(54) ELECTRONIC EQUIPMENT

(75) Inventors: Keiji Taniguchi, Higashihiroshima (JP); Masaaki Sasa, Hiroshima (JP); Norio Ito, Chiba (JP); Ryuji Kitaura, Sakura (JP)

(73) Assignee: Sharp Kabushiki Kaisha, Osaka (JP)

( * ) Notice: Subject to any disclaimer, the term of this patent is extended or adjusted under 35 U.S.C. 154(b) by 121 days.

(21) Appl. No.: 10/648,370

(22) Filed: Aug. 27, 2003

(65) Prior Publication Data

US 2004/0058715 A1    Mar. 25, 2004

(30) Foreign Application Priority Data

Sep. 24, 2002  (JP)  ............... 2002-277149

(51) Int. Cl.
| | |
|---|---|
| H04N 13/04 | (2006.01) |
| H04N 5/225 | (2006.01) |
| G06T 15/00 | (2006.01) |
| G06T 15/40 | (2006.01) |

(52) U.S. Cl. .................. 348/51; 348/169; 345/419; 345/422; 345/629

(58) Field of Classification Search .................. 349/15; 345/419, 653

See application file for complete search history.

(56) References Cited

U.S. PATENT DOCUMENTS

| 5,315,377 A | * | 5/1994 | Isono et al. .................... 348/51 |
| 6,584,219 B1 | * | 6/2003 | Yamashita et al. .......... 382/154 |
| 6,765,568 B1 | * | 7/2004 | Swift et al. ................. 345/419 |

FOREIGN PATENT DOCUMENTS

| JP | 5-122733 A | 5/1993 |
| JP | 7-236164 A | 9/1995 |
| JP | 2001-251403 A | 9/2001 |
| KR | 2002-0027415 | 4/2002 |

* cited by examiner

*Primary Examiner*—Ulka Chauhan
*Assistant Examiner*—Eric Woods
(74) *Attorney, Agent, or Firm*—Birch, Stewart, Kolasch & Birch, LLP

(57) ABSTRACT

In an electronic equipment provided with 2D (two-dimensional) and 3D (three-dimensional) displaying functions, an easily viewable 2D image screen and an enjoyable 3D image screen are switched and displayed with a simple key operation. A first display portion of the electronic equipment does not generate optical parallax during the display of 2D image, enabling display of an easily viewable 2D image screen. The electronic equipment shares the data, permitting switching of the 2D image display to 3D image display.

19 Claims, 13 Drawing Sheets

FIG.9    PRIOR ART

| Col 0 | Col 1 | Col 2 | Col 3 | Col 4 | Col 5 |
|---|---|---|---|---|---|
| R G B | R G B | R G B | R G B | R G B | R G B |
| R G B | R G B | R G B | R G B | R G B | R G B |
| R G B | R G B | R G B | R G B | R G B | R G B |
| R G B | R G B | R G B | R G B | R G B | R G B |
| R G B | R G B | R G B | R G B | R G B | R G B |
| R G B | R G B | R G B | R G B | R G B | R G B |

ELECTRONIC EQUIPMENT

This Nonprovisional application claims priority under 35 U.S.C. §119(a) on Patent Application No(s). 2002-277149 filed in JAPAN on Sep. 24, 2002, the entire contents of which are hereby incorporated by reference.

BACKGROUND OF THE INVENTION

1. Field of the Invention

The present invention relates to an electronic equipment, and more particularly to an electronic equipment provided with two-dimensional (hereinafter, "2D") and three-dimensional (hereinafter, "3D") displaying functions.

2. Description of the Background Art

In recent years, advanced electronic equipment has been developed including portable equipment such as portable terminals, portable personal computers and mobile phones, information equipment such as desktop personal computers, and audio/video equipment.

For example, a mobile phone with a 3D display having a 3D displaying function and allowing switching between 2D/3D displays has been proposed. In this conventional mobile phone, to switch between the 2D/3D displays, a lenticule located above a liquid crystal display as a displaying body is made movable to allow a change of displaying regions of a 2D displaying portion and a 3D displaying portion (e.g., Japanese Patent Laying-Open No. 2001-251403, pages 1–12, and FIG. 9).

A configuration of a 3D display switchable with a 2D display is described with reference to FIGS. 9–14.

FIG. 9 shows a layout of pixels of a liquid crystal device (LCD) of a standard type. The LCD is used for a color display, and is formed of pixels of red (R), green (G) and blue (B). The pixels are arranged in columns Col0–Col5 where the red, green and blue pixels are arranged in a vertical direction. The leftmost column Col0 of the pixels corresponds to the leftmost strip of a displayed image, and the adjacent column Col1 to the right corresponds to the next strip of the image, and so on.

The display shown in FIG. 10 is used for a stereoscopic 3D display. The 3D display includes a liquid crystal display device (having a polarizing plate) 101 which serves as a spatial light modulator for adjusting light from a backlight 102 in accordance with the content of the image to be displayed. A parallax optic cooperates with liquid crystal display device 101 to form a viewing window. Hereinafter, the optical configuration of the display device in a state causing parallax is called the "parallax optic". FIG. 10 shows an automatic stereoscopic 3D display of a front parallax barrier type which includes a parallax barrier 103 as the parallax optic. Parallax barrier 103 includes a plurality of slits 104 which extend in a vertical direction and are arranged at regular intervals in a lateral direction in parallel with each other. Each slit 104 is positioned at a center of a pair of pixel columns of different colors. For example, slit 104 in FIG. 10 is aligned with the column 105 of blue pixels and the column 106 of green pixels.

Left and right image data are provided to liquid crystal display device 101 of a type shown in FIG. 10 in a manner shown in FIG. 11, to ensure proper arrangement of left and right viewing windows. In FIG. 11, color image data of the leftmost strip of the left image is displayed by the red, green and blue pixel columns denoted by "Col0 left". Similarly, color data of the leftmost strip of the right eye view is displayed by the pixel columns denoted by "Col0 right". With this arrangement, the image data of the left and right views are reliably transmitted to appropriate left and right viewing windows. This arrangement also ensures that all the three pixel colors R, G and B are used to display each view strip.

In the layout shown in FIG. 11, different from the layout shown in FIG. 9, the red and blue pixels in the leftmost column display image data of the left view, while the green pixels in the leftmost column display image data of the right view.

In the next column, the red and blue pixels display image data of the right view, whereas the green pixels display image data of the left view. As such, in the case where a standard liquid crystal display device of a type shown in FIGS. 9–11 is employed, it is necessary to interlace image data of the left and right views by "replacing" the green components with each other between the RGB pixel columns. It is of course possible to replace red or blue components, instead of the green components, depending on setting of a display.

FIG. 12 shows a portion of a display controller. Data to be displayed are provided in series on a data bus 120. Addresses defining positions of the pixels on a screen are supplied on an address bus 121. Data bus 120 is connected to inputs of a number of banks of random access memories such as memories (video random access memories, VRAM) 122 and 123 (two memories are shown in the drawing). Address bus 121 is connected to a memory management system 124. Memory management system 124 converts a screen address to a memory address to be supplied to address inputs of memories 122 and 123.

Output ports of memories 122 and 123 are connected via a latch circuit 130 to a fast in fast out (FIFO) register 125 of a video controller 126. Memories 122 and 123 and register 125 are controlled such that respective pixel data are read out of memories 122 and 123 alternately and supplied to a displaying memory (VRAM) 127 in a correct order. Displaying memory 127 is provided between FIFO register 125 and a driver circuit of liquid crystal display device 101, and temporarily stores the arranged display data.

FIG. 13 shows latch circuit 130 in more detail. Latch circuit 130 includes latches 140 and 141 connected to output ports of memories 122 and 123, respectively. Each of latches 140 and 141 includes 24 one-bit latches which are arranged in groups of 8 latches latching R, G and B data from the corresponding memory. Latches 140 and 141 have latch enable inputs collectively connected to an output of a timing generator 128 supplying a latch enable signal L.

Latch circuit 130 further includes three switching circuits 142, 143 and 144. Each switching circuit includes eight switching elements having control inputs collectively connected to an output of timing generator 128 supplying a switching signal SW. Timing generator 128 further has an output for supplying a write enable signal F to register 125.

It is noted that switching circuit 143 corresponding to G data is switched to latch circuit 140, 141 different from that to which other switching circuits 142 and 144 are switched.

Latch enable signal L attains a "high" level when display data are available at the output ports of memories 122 and 123. Thus, latches 140 and 141 latch the display data. Immediately after latch enable signal L returns to a "low" level, switching signal SW rises to a "high" level. Next, switching circuits 142, 143 and 144 are switched to the states shown in FIG. 13, and the R, G and B outputs of latch 140 are connected to register 125. Thereafter, write enable signal F is supplied to register 125, and the RGB data from latch 140 are written into register 125. Write enable signal F is then disabled to prevent additional writing of data to register 125 until application of a next write enable signal.

Thereafter, switching signal SW attains a "low" level, and switching circuits 142, 143 and 144 connect the output of latch 141 to register 125. Write enable signal F is then generated, and data from latch 141 is written into register 125. At the same time, the data having been written into register 125 are written into displaying memory 127. Next, latch enable signal L rises to a "high" level, and the same processing is repeated. As such, the data are written from memories 122 and 123 alternately to register 125. Correspondingly, the data having been written into register 125 are sequentially written into displaying memory 127. The processing is repeated until data necessary for display of one image screen is written into displaying memory 127.

Processing in the case of writing 2D or monoscope data which should be displayed for both eyes of an observer is as follows. The parallax optic by parallax barrier 103 is removed from the light path of liquid crystal display device 101. The monoscope pixel data are directly input and stored in displaying memory 127 of FIG. 12 for execution. In the 3D display mode, the left eye image and the right eye image each have a resolution half the horizontal spatial resolution of liquid crystal display device 101. When the display operates in the 2D or monoscope mode, the left and right eye images each have a resolution twice the resolution in a lateral direction of liquid crystal display device 101 when it operates in the 3D display mode.

FIG. 14 shows by way of example a display device configured to switch and display the 2D and 3D images by selectively forming a parallax optic. In this display device, whether to cause parallax between the two eyes of the observer may be made selectable in an electrical manner. Here, as the parallax optic, the liquid crystal device as described above, i.e., 2D/3D switching liquid crystal device (LCD) 150, and a patterning phase contrast plate 151 are used. Switching liquid crystal device 150 has a mat electrode for switching the entire surface between 3D and 2D images. Patterning phase contrast plate 151 replaces one of the two polarizing plates of the liquid crystal device. The portions in FIG. 14 having substantially the same functions as those in FIG. 10 are denoted by the same reference characters. In the example shown in FIG. 14, a parallax barrier 103' is placed on the back surface of liquid crystal display device 101 or on the backlight 102 side. Alternatively, it may be placed on the front side of liquid crystal display device 101, as shown in FIG. 10.

In the arrangement shown in FIG. 14, a voltage is not applied to switching liquid crystal device 150 when a 3D image is displayed. Thus, the internal liquid crystal molecule maintains the rotated state. Slits, substantially the same as slits 104 of parallax barrier 103 in FIG. 10, are formed according to a pattern of patterning phase contrast plate 151, by virtue of the polarizing characteristic of the light with respect to patterning phase contrast plate 151. When a 2D image is displayed, a voltage is applied to switching liquid crystal device 150, and rotation of the liquid crystal molecule is cancelled. Thus, patterning phase contrast plate 151 is no longer affected by the incident light, irrelevant to presence or absence of a pattern, so that formation of slits is cancelled.

Alternatively, a liquid crystal display device including a pair of polarizing plates for switching between 2D and 3D displays may be employed to selectively display a display pattern of the display device similar to the pattern of parallax barrier 103, as described in Japanese Patent Laying-Open No. 5-122733 or No. 7-236174.

A 2D image can be displayed on the automatic stereoscopic 3D display as shown in FIG. 10 provided with a mechanical parallax optic, by making left and right displayed screen images same with each other, with parallax barrier 103 being attached. In this case, however, the display itself has the parallax optic formed. Thus, even when a 2D image is displayed, a user will be affected by the parallax optic when seeing the display.

On the other hand, selectively forming the parallax optic as shown in FIG. 14 is advantageous in that display of the 2D image is unaffected by the parallax. That is, in the case of arrangement of FIG. 14, when the 2D-image display is selected, the parallax optic is not formed or otherwise formed only in a portion of the displayed region. At this time, the display has a device structure substantially the same as in a normally used liquid crystal display device. Thus, the user can easily recognize the image from any position, unaffected by the parallax of the left and right eyes.

It is tiresome to see a stereoscopic 3D display in a moving vehicle or continuously for a long time. Further, there are some who cannot make the 3D image in their heads by nature. In such cases, it is desirable to switch the 3D image display to the 2D image display. In addition, if the 2D-image display can be switched to a stereoscopic or 3D-image display, an interesting display having an impact on the user will be provided.

SUMMARY OF THE INVENTION

The present invention has been made to solve the above-described problems. An object of the present invention is to provide an electronic equipment capable of switching and displaying a 3D image and an easily viewable 2D image, which includes a display portion switching and displaying the 2D image and the 3D image by selection of formation of a parallax optic, and a display switching portion instructing switching between the 2D image and the 3D image involving the parallax optic in the display portion.

In summary, an electronic equipment according to the present invention includes a display portion for switching and displaying a two-dimensional image and a three-dimensional image by selecting formation of a parallax optic, and a control portion controlling display on the display portion.

The control portion instructs switching of the display between the two-dimensional image and the third-dimensional image involving the parallax optic. The control portion generates data for two-dimensional display and data for three-dimensional display from common data based on the instruction.

According to the present invention, the state generating optical parallax and the state not generating the optical parallax are formed in the display portion, making the two-dimensional display and the three-dimensional display possible. Further, the data for the display are generated from the common data, which eliminates the need to store data for display of the respective dimensions.

Preferably, the common data includes image data corresponding to several views, and the control portion generates the data for the two-dimensional display based on one of the image data corresponding to the several views.

Preferably, the common data includes image data corresponding to the several views, and the control portion generates the data for the two-dimensional display based on the image data corresponding to the several views having been selectively extracted.

Preferably, the common data includes image data representing a two-dimensional image. Data for the three-dimensional display includes image data corresponding to the several views. The control portion generates the image data corresponding to the several views based on the image data representing the two-dimensional image.

Preferably, the display portion includes a liquid crystal device electrically selecting presence/absence of the parallax optic.

Preferably, the liquid crystal device includes a two-dimension/three-dimension switching liquid crystal device and a patterning phase contrast plate.

Preferably, the liquid crystal device includes a liquid crystal device selectively performing pattern display of a parallax barrier.

According to another aspect of the present invention, an electronic equipment includes a memory for storing common data used commonly for display of a two-dimensional image and a three-dimensional image, a display portion for displaying one of the two-dimensional image and the three-dimensional image by selectively forming a state where optical parallax is generated, a display control portion for controlling an operation of the display portion based on an input signal, and a control portion controlling the memory and an operation of the display control portion.

The control portion detects an instruction to display one of the two-dimensional image and the three-dimensional image. The control portion generates data for the display of the two-dimensional image and data for the display of the three-dimensional image based on the common data read from the memory in accordance with the instruction. The control portion then outputs a command for enabling the display of one of the two-dimensional and three-dimensional images and the generated data for the display to the display control portion.

Preferably, the display portion includes a plurality of display elements and a switching portion for causing the optical parallax to be selectively generated with respect to images displayed by the plurality of display elements. The two-dimensional image is displayed when the switching portion attains a state where the optical parallax is not generated. The common data includes data corresponding several views, which correspond to the respective display elements.

The control portion generates the data for the display of the two-dimensional image based on portions of the data corresponding to the several views read from the memory.

Preferably, the display portion displays the two-dimensional image based on the data for the display of a predetermined amount.

The control portion generates the data for the display of the predetermined amount by duplicating one of the data corresponding to the several views read from the memory.

Preferably, the display portion displays the two-dimensional image based on the data for the display of a predetermined amount. Data corresponding to the display elements include first data for causing parallax to exceed predetermined parallax and second data for causing parallax not to exceed the predetermined parallax.

The control portion generates duplicate data by duplicating the first data on a predetermined basis. The control portion generates the data for the display of the predetermined amount by combining the first data, the duplicate data and the second data.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 shows a pixel layout of a liquid crystal device.

DESCRIPTION OF THE PREFERRED EMBODIMENTS

Figure 1:
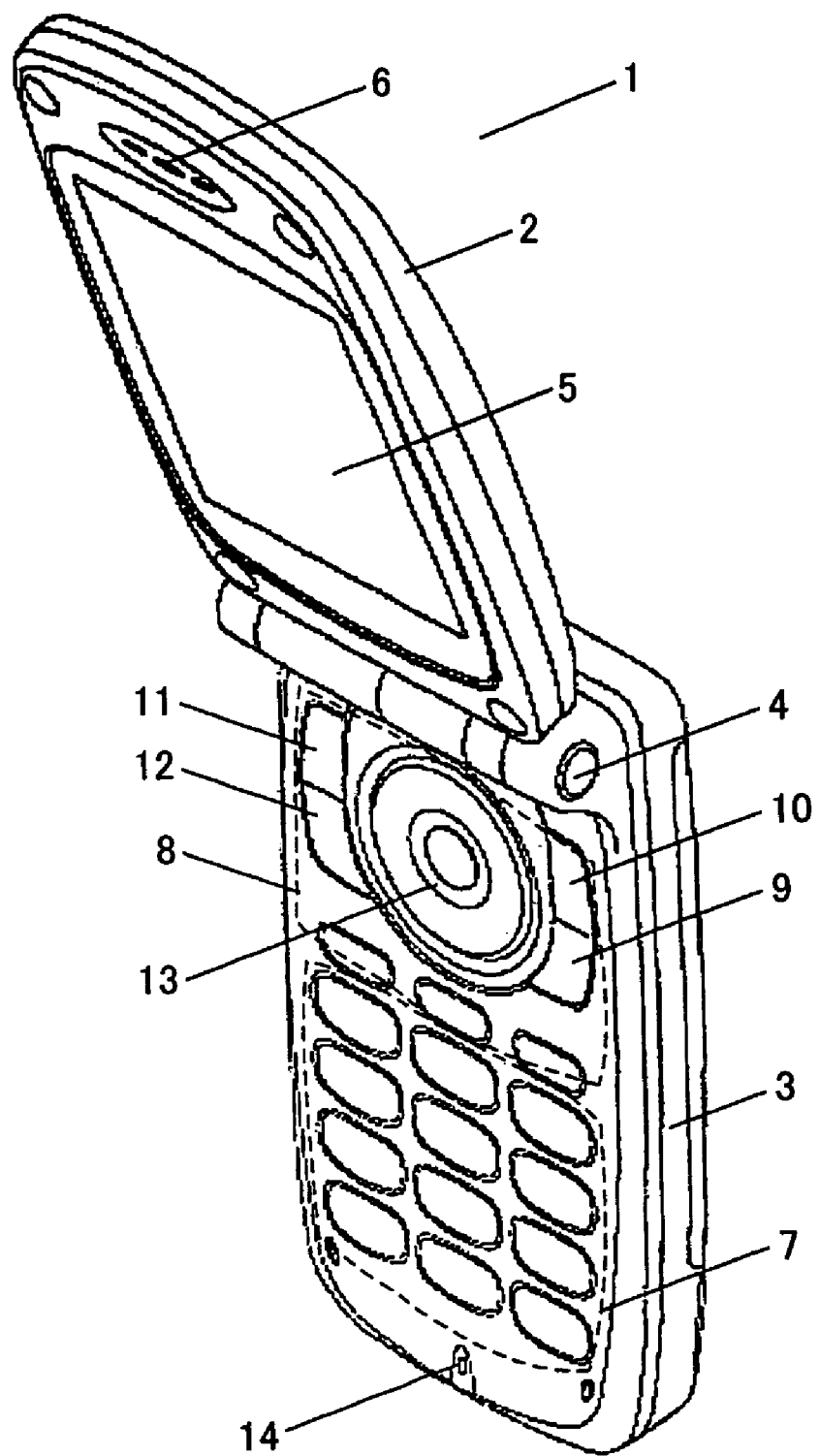
FIG. 1 is a perspective view of an electronic equipment according to an embodiment of the present invention.

An embodiment of the present invention is described with reference to the drawings. FIG. 1 is a perspective view showing a mobile phone 1 equipped with a camera of a clam shell type as an embodiment of the present invention, in an unfolded state.

Mobile phone 1 is provided with a first housing 2 and a second housing 3, which are connected with each other via a hinge 4. The housings can pivot around hinge 4 in free angular displacement, making the mobile phone foldable. Referring to FIG. 1, mobile phone 1 has a first display portion 5 in first housing 2. First display portion 5 is arranged so that it is located on the inner side of mobile phone 1 when it is folded. First display portion 5 is a display device configured to switch and display 2D and 3D images by electrically selecting presence/absence of formation of a parallax optic. First display portion 5 displays an image based on image data received via a first display driver portion 43 as will be described later. A first speaker 6 for use in talking is arranged in a portion above first display portion 5.

Second housing 3 of mobile phone 1 as the embodiment of the present invention is now described. An input button group 7 includes keys for inputting numbers and letters. A function button group 8 includes buttons for switching various settings/functions of mobile phone 1. Specifically, function button group 8 includes a power supply button 9 for switching ON/OFF of power supply, a first shutter button 10 for a camera function as will be described later, a mail/guidance button 11 for a mail function and guidance display, a start/speaker-on button 12 for starting calling using a speaker, and a multi-guide button 13 formed of four-direction buttons and a decision button for selecting up, down, left or right and making a decision on a function selecting screen. A microphone 14 is placed in a lower portion of second housing 3.

Hinge 4, function button group 8, input button group 7 and microphone 14 are arranged in second housing 3 of mobile phone 1 normally in this order, although not limited thereto.

Figure 2:
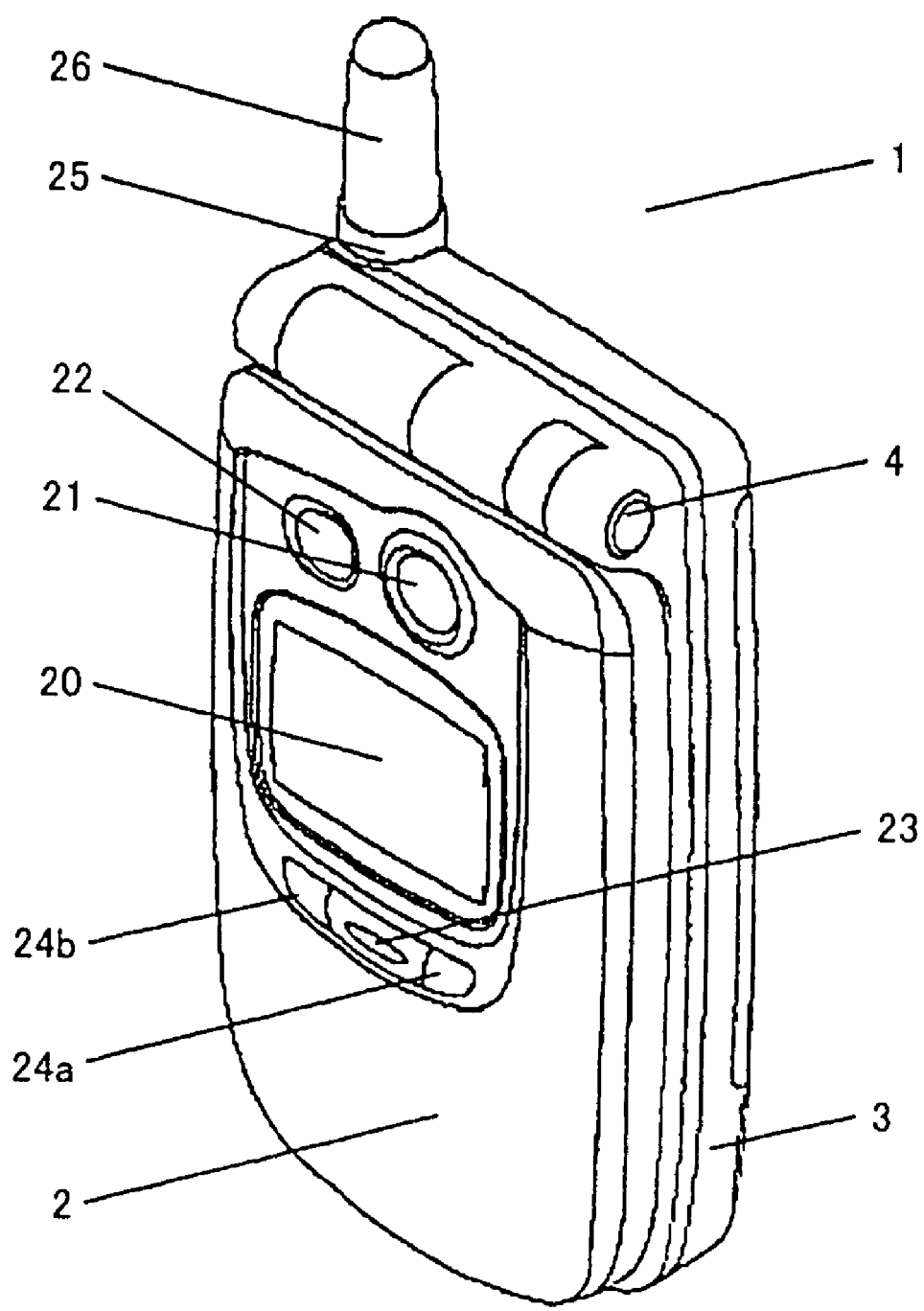
FIG. 2 is a perspective view of the electronic equipment of the embodiment in a folded state.

FIG. 2 shows mobile phone 1 in a folded state. Referring to FIG. 2, on the back surface of first housing 2, a camera portion 21 and a light portion 22 are arranged side by side closest to hinge 4. A second display portion 20, a second shutter button 23 and a second operation button group 24 are arranged in this order from the hinge 4 side.

Second display portion 20 is arranged so that it is located on the outer side of mobile phone 1 when it is folded. Second display portion 20 is implemented with a liquid crystal display, an EL (electro luminescence) display or the like. Second display portion 20 displays images based on image data of character images indicating time information, radio intensity, mail reception and others and pickup images received via a second display driver portion 44 as will be described later. When second display portion 20 displays these images, the images based on the image data sent from second display driver portion 44 to second display portion 20 are displayed so that the hinge 4 direction is up. Thus, the user can use mobile phone 1 in a folded state with the hinge direction up. This ensures that the direction of second housing 3 does not change regardless of whether mobile phone 1 is folded or unfolded by the user. In other words, it is unnecessary to change the direction of mobile phone 1 every time the user folds and unfolds mobile phone 1, resulting in improvement of operability and usefulness. The image displayed on second display portion 20 also includes the pickup image. The user does not have to change the direction of mobile phone 1 when seeing the pickup image, again resulting in improved operability and usefulness.

Camera portion 21 includes an image pick-up lens, an image pick-up device such as a charge coupled device (CCD) image sensor or a complementary metal oxide semiconductor (CMOS) image sensor, and a three-color filter of RGB. Camera portion 21 separates light having been reflected by a subject and entered the image pick-up lens into light rays of three colors of RGB through the color filter, which rays are input to the image pick-up device separately. As shown in FIG. 2, camera portion 21 is located on the outer side of mobile phone 1 when it is folded, between hinge 4 and second display portion 20. The user grips second housing 3 when taking a picture with mobile phone 1 unfolded.

Light portion 22 is used for an auxiliary light source when taking a picture with camera portion 21. Although a xenon tube is generally used as the auxiliary light source, recently there are cases where light emitting diodes (LED) of RGB are made to radiate simultaneously to obtain white light for use as the auxiliary light source.

Second shutter button 23 is placed at the center of the back surface of first housing 2. In the folded state of mobile phone 1 as shown in FIG. 2, second shutter button 23 is located below second display portion 20. Provision of second shutter button 23 in this position allows the user to easily confirm the position of the shutter button and readily take a picture with the phone in the folded state.

Second operation button groups 24a, 24b are provided on respective sides of second shutter button 23 for performing various settings and operations using second display portion 20. The second operation button groups cooperate with second display portion 20 to allow the user to perform settings of various functions, display/search of an address book, confirmation/display/sending of mails and others. Further, the user can perform a zooming operation when taking pictures, and forward and backward display of a plurality of pictures taken.

An antenna portion 25, a helical portion 26 movable upward and downward, a battery portion (not shown) for storage of a battery, and a second speaker (not shown) for notifying of an incoming call are provided on the back surface of second housing 3.

First housing 2 is mechanically connected with second housing 3 via hinge 4. A flexible substrate for electrically connecting first and second housings 2 and 3 is provided inside hinge 4.

Figure 3:
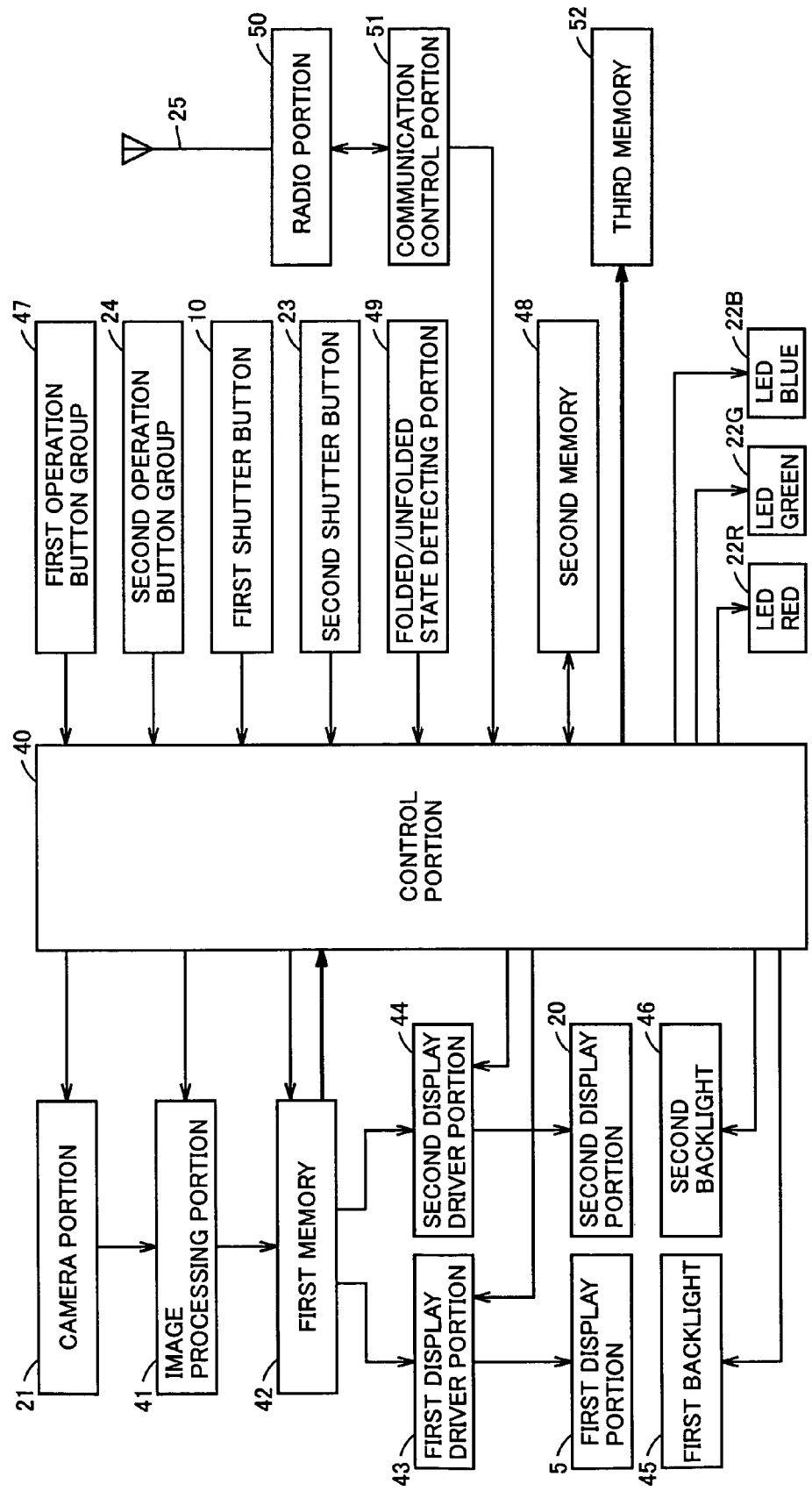
FIG. 3 is a block diagram showing a configuration of the electronic equipment of the embodiment.

FIG. 3 shows by way of example a configuration of an internal circuit of mobile phone 1.

A control portion 40 includes an operation control portion which controls operations of the respective parts constituting mobile phone 1, a shutter button control portion, a backlight control portion, a light control portion, and a display control portion. An image processing portion 41 includes an amplification portion, an analog/digital (A/D) conversion portion, and a signal processing portion. The amplification portion amplifies an electric signal corresponding to RGB transmitted from camera portion 21 and sends the signal to the A/D conversion portion. The A/D conversion portion converts the analog electric signal corresponding to RGB amplified by the amplification portion to a digital signal, and outputs and sends image data to the signal processing portion. The signal processing portion performs signal processing such as pixel interpolation processing on the image data sent from the A/D conversion portion. The signal processing portion sends the image data having undergone the signal processing to first memory 42 based on a control signal transmitted from control portion 40. Camera portion 21 and image processing portion 41, serving as the image pick-up portions, convert incident light into an electric signal for output as image data. First memory 42 temporarily stores the image data transmitted successively from the signal processing portion, e.g., by erasing old image data, or by overwriting the old image data with the latest image data.

Control portion 40 transmits a control signal as well as the image data stored in first memory 42 to first and second display driver portions 43, 44. First and second display driver portions 43, 44 apply driving voltages to the respective pixel electrodes of first and second display portions 5, 20 in accordance with the image data to be displayed on first and second display portions 5, 20.

First and second backlights 45, 46 include light emitting devices such as light emitting diodes, and irradiate first display portion 5 and second display portion 20 with light to increase the brightness.

Control portion 40 controls on/off and adjusts brightness of first and second backlights 45, 46. First operation button group 47 includes input button group 7 and function button group 8 of second housing 3 described above. Second operation button group 24 is placed at first housing 2 as described above.

When the user wishes to store specific image data among the image data successively transmitted to and temporarily stored in first memory 42, the user operates first or second shutter button 10, 23 to output to control portion 40 an instruction signal to store the image data in third memory 52. Control portion 40, in response to the instruction signal from first or second shutter button 10, 23, stores the specific image data, stored in first memory 42, in third memory 52. Second memory 48 is used for displaying image data, as is first memory 42.

A folded/unfolded state detecting portion 49 detects whether mobile phone 1 is folded or not. A detect switch (not shown) is provided inside hinge 4. A signal indicating a folded/unfolded state of mobile phone 1 is sent to control portion 40, and control portion 40 determines whether mobile phone 1 is folded or not.

An antenna portion 25 transmits/receives voice data, text data, image data and others in radio communication with a base station over radio waves. A radio portion 50, upon reception, demodulates data received from the base station via antenna portion 25. Upon transmission, radio portion 50 transmits the text data, image data and others transmitted from a communication control portion 51 to control portion 40 based on a predetermined protocol. The data received from a sender via radio portion 50 and communication control portion 51 are stored in third memory 52.

Control portion 40 switches a display portion displaying an image based on the image data temporarily stored in first memory 42 in accordance with the detection result of folded/unfolded state detecting portion 49. When folded/unfolded state detecting portion 49 detects that mobile phone 1 is folded, control portion 40 outputs the image data from first memory 42 to second display driver portion 44 to cause the image to be displayed on second display portion 20. When folded/unfolded state detecting portion 49 detects that mobile phone 1 is unfolded, control portion 40 outputs the image data from first memory 42 to first display driver portion 43 so that the image is displayed on first display portion 5.

Camera portion 21 is provided on the outer side of mobile phone 1 when it is folded. Thus, when the user of mobile phone 1 picks up an image of a subject other than him/herself, the user does so by aiming camera portion 21 at the subject opposite to the user, with mobile phone 1 unfolded. In this case, folded/unfolded state detecting portion 49 detects the unfolded state of mobile phone 1, and an image based on the image data output from camera portion 21 is displayed on first display portion 5. This permits the user to use first display portion 5 as a viewfinder when taking a picture.

On the other hand, when the user picks up an image of him/herself, the user does so by aiming camera portion 21 at him/herself with mobile phone 1 folded. In this case, folded/unfolded state detecting portion 49 detects the folded state of mobile phone 1, and an image based on the image data output from camera portion 21 is displayed on second display portion 20. The user can use second display portion 20 as a viewfinder when taking a picture. Mobile phone 1 as the embodiment of the present invention allows the user to take a picture of him/herself even in the unfolded state.

Figure 12:
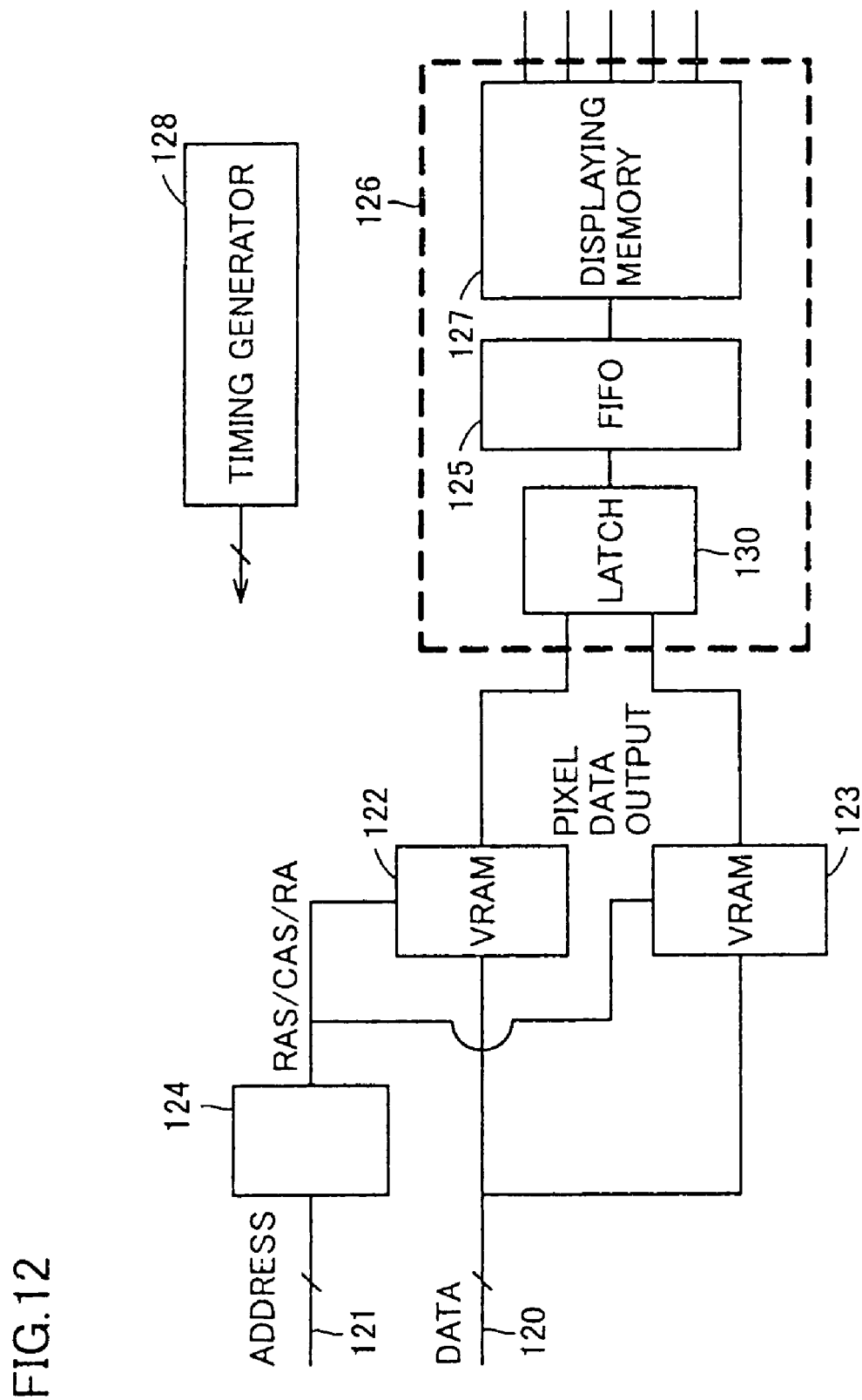
FIG. 12 is a block diagram showing a configuration of a display controller.
Figure 13:
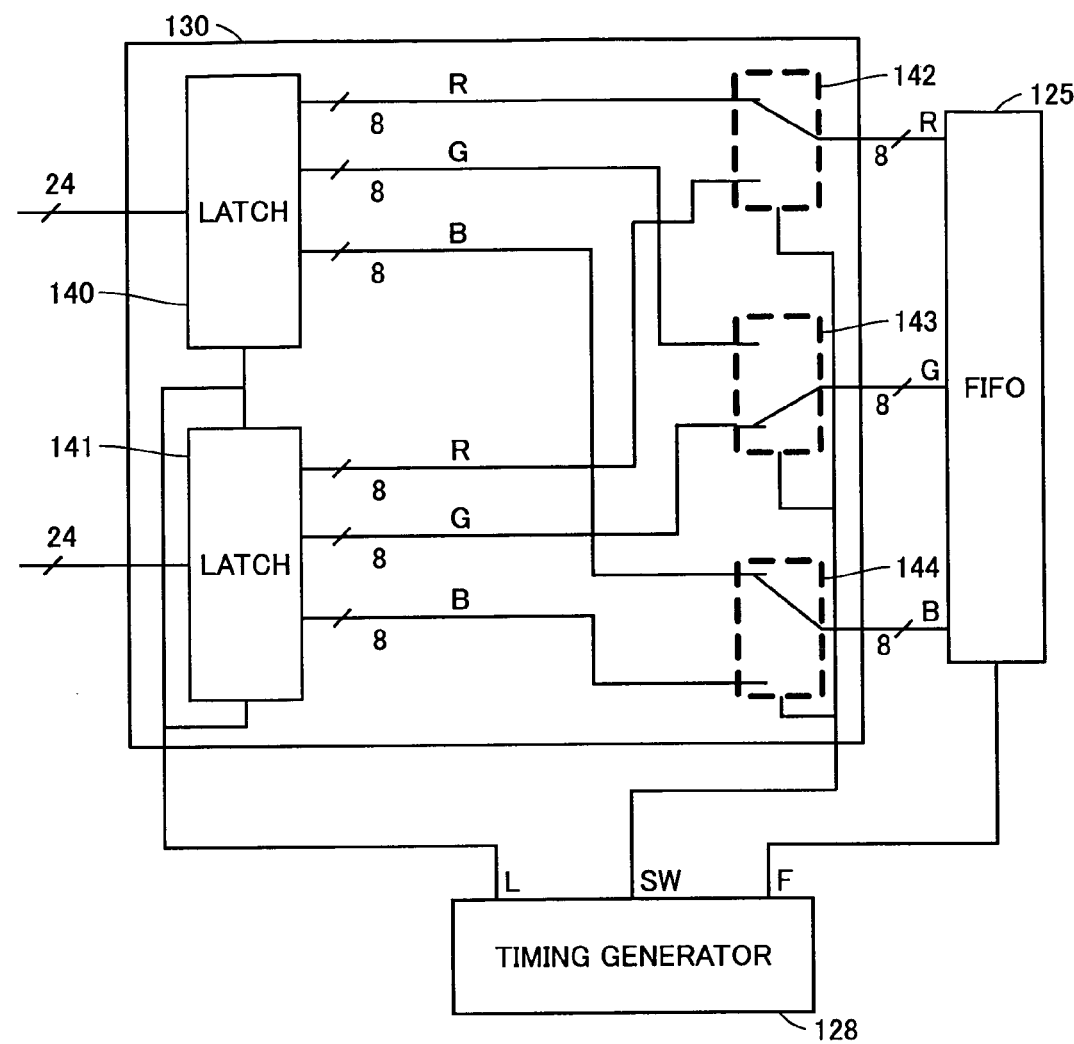
FIG. 13 is a block diagram showing a portion of the display controller in detail.
Figure 14:
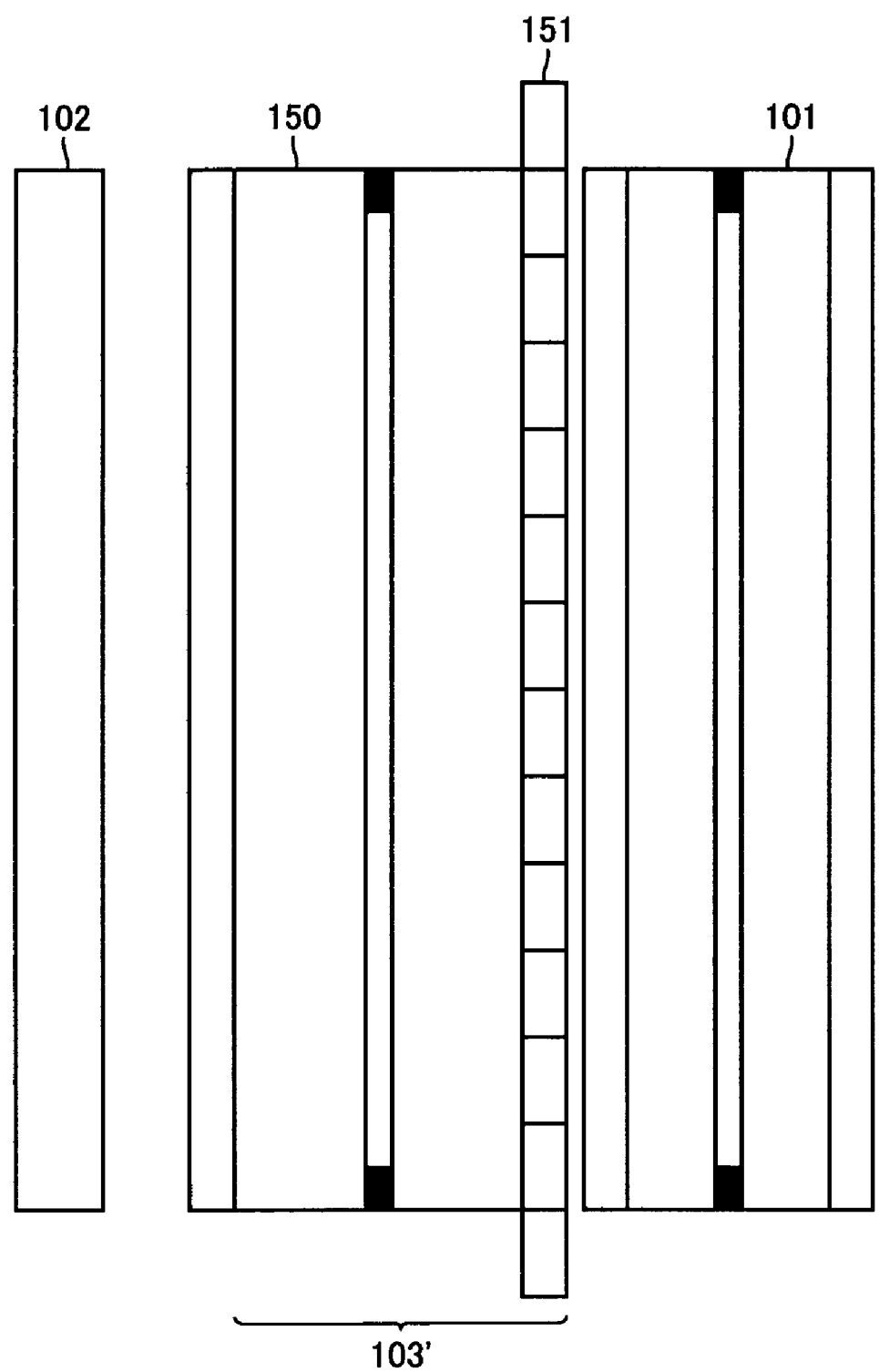
FIG. 14 is a cross sectional view showing a configuration of a 2D/3D switchable display device.

First display portion 5 is provided with a display device which can switch and display 2D and 3D images, as described in conjunction with FIG. 14. Second display portion 20 is provided with a conventional display device which can display only the 2D image. First display driver portion 43 connected to first display portion 5 includes memories 122, 123 and video controller 126 described in conjunction with FIG. 12.

First display portion 5 is set to a 2D-image display mode when a user takes a picture with camera portion 21 using first display portion 5 as a viewfinder. That is, first display portion 5 is set to the 2D-image display mode when mobile phone 1 of the present embodiment is set to an image pick-up mode by key operation or the like. The image picked up by camera portion 21 is normally generated as a 2D image, without being divided into left-eye and right-eye images, until it is subjected to special conversion into a 3D image. Thus, in first display portion 5, 2D/3D switching liquid crystal device 150 is switched to a 2D-image mode, and the image data picked up by camera portion 21 is directly input from first memory 42 to the displaying memory 127 of video controller 126 within first display driver portion 43. As such, the image picked up by camera portion 21 is displayed in real time until the user operates a shutter button using the 2D display as a viewfinder.

In this mobile phone 1, especially first display portion 5 as a main displaying body is large in size, and a high-precision liquid crystal device can readily be used therefor. Thus, displaying a 2D image, not restricted to the above-described image picked up by a camera, on first display portion 5 permits the user to enjoy display of the more beautiful 2D image.

In first display portion 5, display of a 3D image is possible when a content of 3D image data is sent from a Web site or via a mail, for example, and received at mobile phone 1 of the present embodiment. The content preferably includes, but is not limited to, one suitable for display in a 3D image rather than a 2D image, such as animation, landscape picture or the like, or one more enjoyable in three dimensions than in two dimensions. In the present embodiment, it is necessary, in view of the characteristic of the display device, that the received data have a content data structure including image data divided corresponding to the left and right eyes. Alternatively, a 3D conversion function may be incorporated in mobile phone 1, and the picture picked up by the camera portion in mobile phone 1 itself may be displayed after converted into 3D image data divided corresponding to the left and right eyes. Still alternatively, mobile phone 1 may receive and display 3D image data transmitted from another mobile phone having a similar function.

Although a standby screen is normally set to a default screen when the mobile phone is not in use as a telephone, it may arbitrarily be set by a user by selecting an image registered in advance, an image picked up by the camera, or an image downloaded by a browser from a Web site or via a mail.

A user can see the 3D display only in one direction. It is tiresome to see the 3D display in a moving vehicle or continuously for a long time. Further, there are some who cannot make the 3D image in their heads by nature. In such cases, it is desirable to switch the 3D-image display to the 2D-image display. On the other hand, if the 2D-image display can be switched to a stereoscopic or 3D-image display, an interesting display having an impact on the user will be provided.

Figure 4:
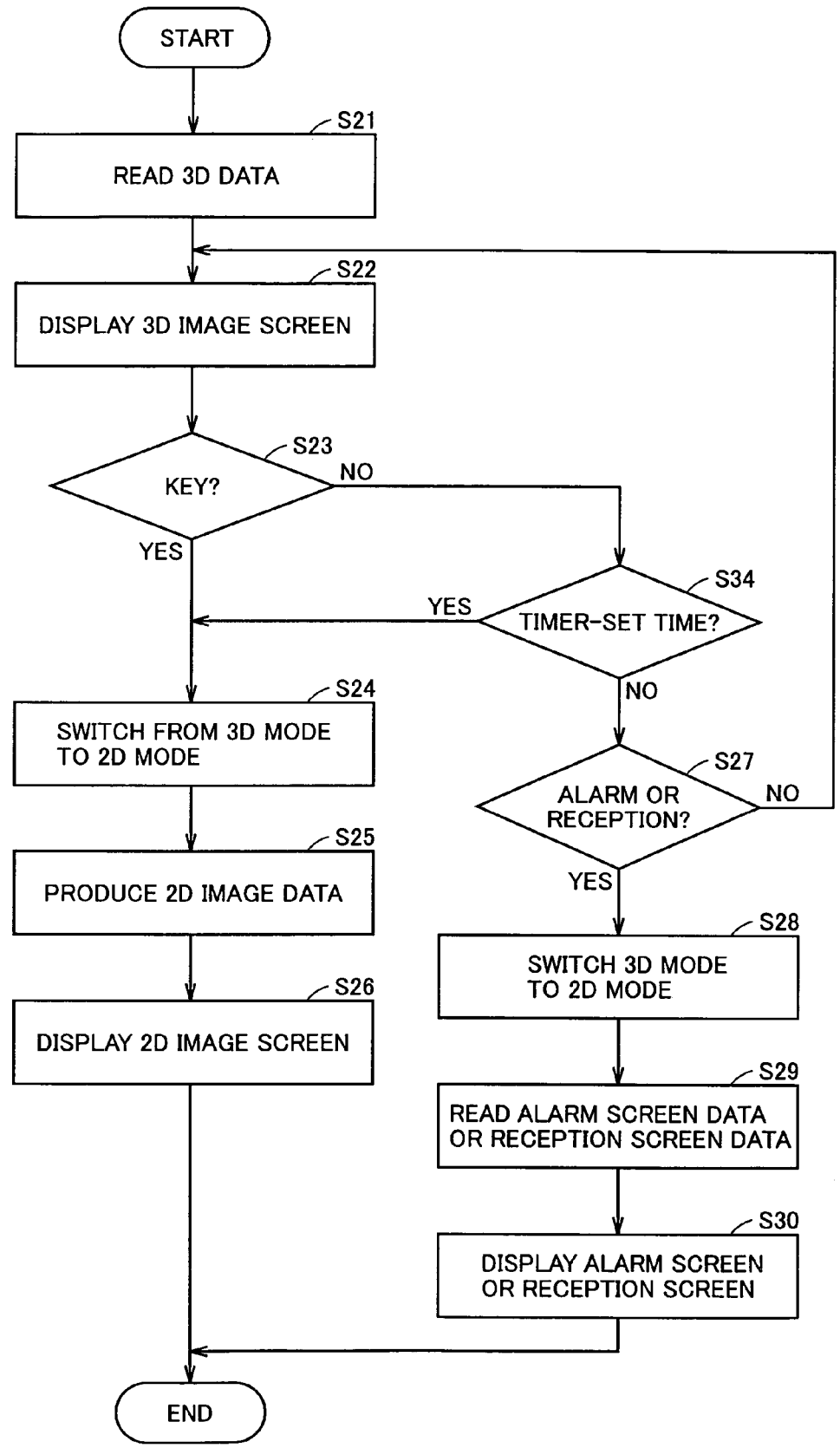
FIGS. 4 and 5 are flowcharts showing image screen control processing of the electronic equipment of the embodiment.

FIG. 4 is a flowchart illustrating by way of example an operation for switching a 3D-image display to a 2D-image display. In mobile phone 1 of the present embodiment, control portion 40 and an arbitrary memory portion constitute a measuring portion which measures a display time of the 3D image.

In the following example, an arbitrary screen displays an arbitrary 3D image, including the case where a content of 3D-image data received from a Web site or via a mail is reproduced, the case where a picture picked up by a camera portion built in the mobile phone is converted into 3D-image data for display, and the case where an image having been picked up and recorded in a memory is reproduced.

A certain 3D screen is normally set as a default screen. Alternatively, the user may select an image registered in advance, an image picked up by a camera, or an image downloaded by a browser from a Web site or via a mail to use for the default screen, as described above. In setting for the default screen, 3D data for the 3D screen is read from third memory 52 to first memory 42 (S21). The 3D data read to first memory 42 is input to first display driver portion 43, and the 3D image screen is displayed on first display portion 5 (S22).

When an instruction is input via a key (of key groups 7, 8 in FIG. 1) while the set screen is being displayed (S23), the display mode of first display portion 5 is switched from the 3D display mode to the 2D display mode (S24). Display data for the 2D image is generated (S25) and input to first display driver portion 43, so that the 2D image screen is displayed (S26).

In the above example, the screen display is switched to the 2D-image display any time a key is operated, leaving no alternative. It is advantageous in that the display can be switched to the 2D-image display with an operation of any key. However, it is of course possible to make the display switched to the 2D-image display only with an operation of an arbitrarily selected key.

If a predetermined timer-set time set by the above-described measuring portion of the display time of the 3D image is up without any key input (S34), the display mode is switched to the 2D-image display mode in a similar manner (S24). Display data for the 2D image is generated (S25) and input to first display driver portion 43, so that the 2D-image screen is displayed on first display portion 5 (S26). A default may be set for the timer-set time. Alternatively, the user may change the timer-set time arbitrarily by key operation or the like. Still alternatively, information indicating a longest and allowable time for display of an image may be included in a content of the image, which information is read when the 3D image is displayed to determine the display time of the image.

The screen display on first display portion 5 may be switched from the 2D image to the 3D image by operation of another arbitrary key. In this case, the display mode of first display portion 5 is switched to the 3D-image display mode, following the above-described process in the opposite direction. 3D data for the 3D-image screen is read from third memory 52 to first memory 42, to display the 3D-image screen on first display portion 5.

Figure 5:
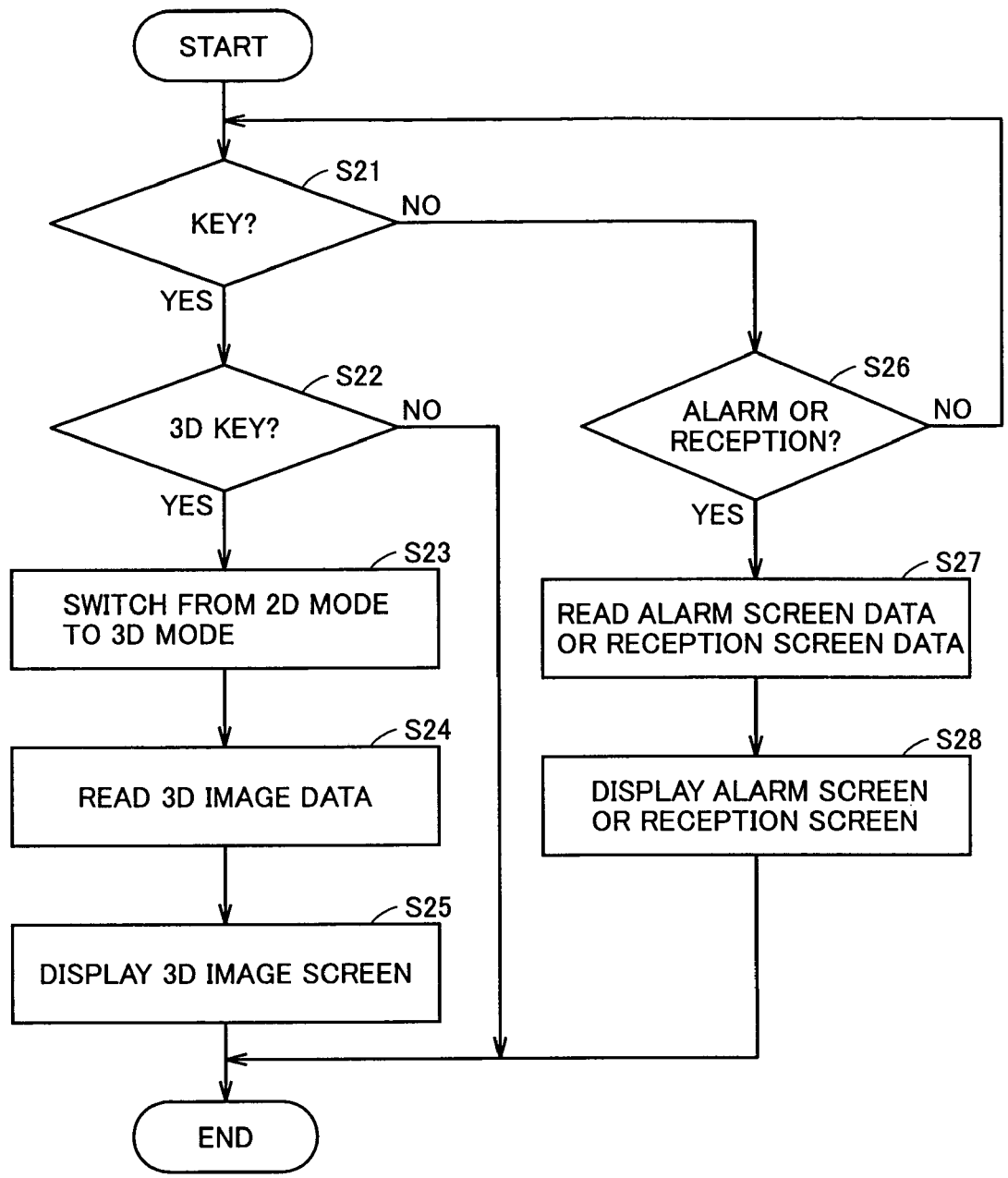

FIG. 5 is a flowchart illustrating by way of example an operation for switching the 2D-image display to the 3D-image display. When there is a key input (S21) and the key is, e.g., a 3D key (S22), then the display mode of first display portion 5 is switched to the 3D-image display mode (S23). 3D data for the 3D-image screen is read from third memory 52 to first memory 42 (S24), and the 3D-image screen is displayed on first display portion 5 (S25).

As described above, the 3D-image display can be switched to the 2D-image display unaffected by the parallax, by key operation or after a lapse of a prescribed time. The 2D-image display can readily be returned to the 3D-image display by key operation, so that the user can enjoy the high-impact 3D display.

Figure 6:
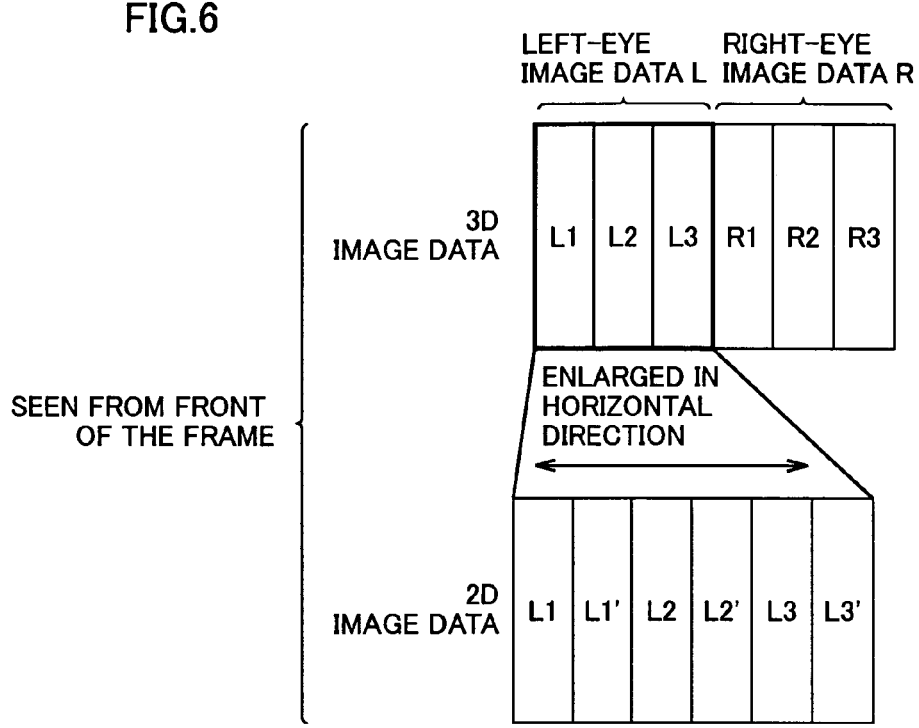
FIG. 6 is a schematic diagram showing how 2D image data is generated from 3D image data using image data for the left eye.

FIG. 6 schematically shows a way of generating 2D image data from 3D image data. Referring to FIG. 6, the 3D image data is formed of left-eye image data L and right-eye image data R arranged side by side in a horizontal direction. Left-eye image data L is divided into strip-shaped blocks L1, L2 and L3 each having one pixel in a lateral direction. Right-eye image data R is divided into similar blocks R1, R2 and R3. The 2D image data is produced by enlarging left-eye image data L of the 3D image data (delimited by a bold line in FIG. 6) twice in a horizontal direction. For enlarging, each strip-shaped block may simply be copied (L1'=L1, and so on), or pixels may be interpolated using values of the surrounding pixels (L1'=(L1+L2)/2, and so on). Interpolation may also be conducted using a low pass filter, instead of using the simple mean values. Although the case of making the 2D image data from left-eye image data L of the 3D image data has been described above, the 2D image data can be formed from right-eye image data R in the same manner. Though the explanation above describes the case having image corresponding to a right and a left image, the way of making 2D image can be applicable to the case having image corresponding to more than two views.

The 2D image data corresponding to a portion of the 3D image generating less parallax such as a background may be formed using both the left-eye and right-eye image data.

A way of producing the 2D image data in this case is now explained.

Figure 7:
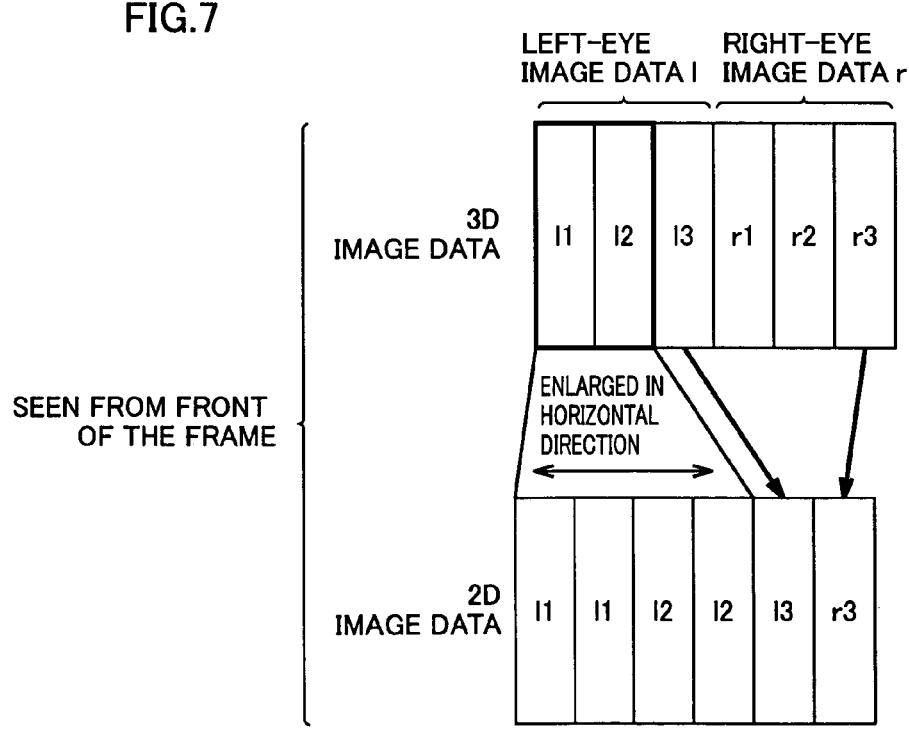
FIG. 7 is a schematic diagram showing how 2D image data is generated from 3D image data using image data for both the left and right eyes.

FIG. 7 shows another way of making the 2D image data from the 3D image data. The 3D image data includes left-eye image data l and right-eye image data r. As in the case of FIG. 6, left-eye image data l is divided into strip blocks of l1, l2 and l3 in a vertical direction, and right-eye image data r is divided into strip blocks r1, r2 and r3 in the vertical direction. Assume that blocks l1 and l2 delimited by a bold line of left-eye image data l of the 3D image data correspond to a foreground region involving the parallax, and block l3 of the data corresponds to a background region hardly generating the parallax. Firstly, blocks l1 and l2 are enlarged twice in a horizontal direction to produce the foreground region of the 2D image data, in a similar manner as in FIG. 6. Next, blocks l3 and r3 are copied as they are, and used to produce the background region of the 2D image data. By doing so, it is possible to make the 2D image data while keeping the horizontal resolution in the portion hardly generating the parallax. Determination of presence/absence of parallax is made by comparing the parallax of the respective region of the image data with predetermined parallax stored in the third memory, for example.

The foreground region of the 2D image data may also be formed from right-eye image data r, instead of left-eye image data l, in the same manner as described above.

Further, the 2D image data formed in the manner shown in FIG. 6 or 7 may be filtered, since aliasing might occur in a horizontal direction due to the interpolation, or the image might blur because of the interpolation filter. In the case of FIG. 6, the foreground region (portions of blocks l1, l1, l2, l2) and the background region (portions of l3, r3) of the 2D image data may be filtered separately from each other, using filters of different properties. For example, the foreground region may be subjected to a sharpening filter for edge enhancement or the like, while the background region may be subjected to a noise cancel filter.

To display the 3D-image screen in three dimensions, first display portion 5 switching and displaying 2D and 3D images is set to the 3D-image display mode. Left-eye and right-eye image data are input to video controller 126 within first display driver portion 43. The data having been arranged are then input to displaying memory 127.

The 3D display is suitable for displaying bit-mapped pictures, paintings or animations, providing the user with enjoyable images.

The 2D-image screen is displayed when first display portion 5 is switched to the 2D-image display mode and data generated in the manner as described in conjunction with FIG. 6 or 7 is directly input to video controller 126 and displaying memory 127. When first display portion 5 displays the 2D image, a voltage is applied to switching liquid crystal device 150 to cancel the rotation of the liquid crystal molecule, as shown in FIG. 14. As a result, patterning phase contrast plate 151 comes to be unaffected by the incident light irrelevant to the presence/absence of the pattern, so that formation of slits is cancelled.

That is, in the case where the 2D-image display is selected, the device structure becomes substantially the same as that of a normally used liquid crystal display device, with the parallax optic unformed at all. Thus, a displaying body is formed which is readily visible from any position unaffected by the parallax of left and right eyes.

Referring to FIG. 4, the following processing may be carried out before the predetermined timer-set time is up. The display is switched from the 3D mode to the 2D mode (S28) when an alarm-set time is up or there is an incoming call or mail (S27). Alarm screen data or reception screen data is read (S29) and input to first display driver portion 43. The data is then displayed on first display portion 5 (S30). In this case, the 2D-image display is convenient, since the user can readily and quickly confirm the content of the alarm or the incoming call/mail.

In the case of FIG. 5, when an alarm-set time is up or there is an incoming call or mail with no key input, alarm screen data or reception screen data is read from third memory 52 to first memory 42 (S27), and the alarm or reception screen of 2D image is displayed on first display portion 5 (S28). As such, when the alarm-set time is up or there is an incoming call or mail while a 3D image is being displayed, the alarm screen or the reception screen is displayed in the 2D image. This permits the user to see the screen including the text display without an influence of the parallax and to readily confirm the content.

Figure 8A:
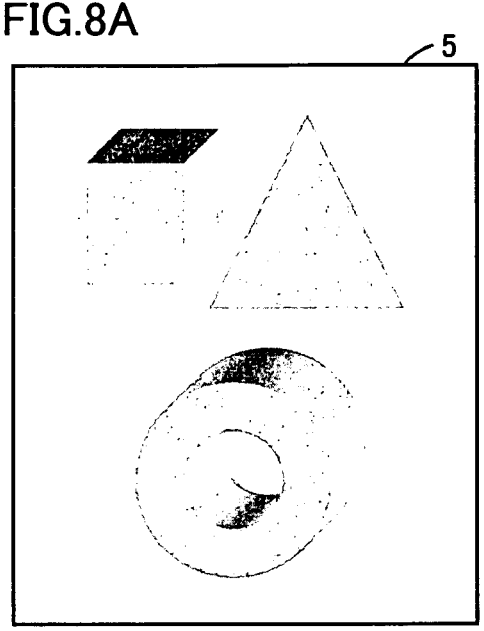
FIGS. 8A–8C show display examples of the electronic equipment of the embodiment.
Figure 8B:
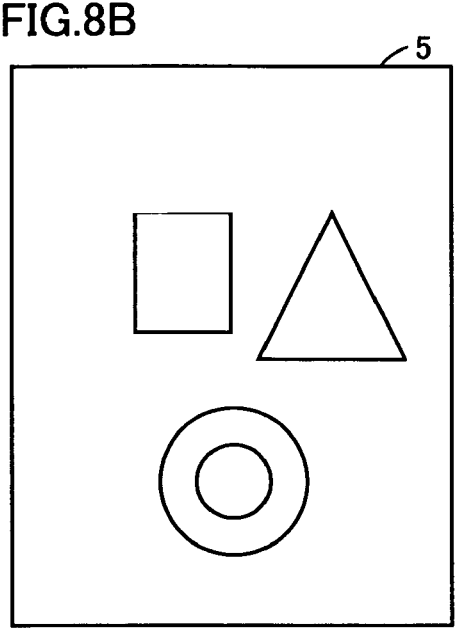
Figure 8C:
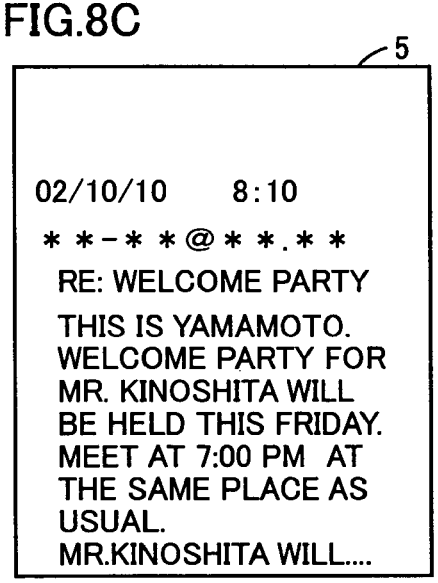
Figure 10:
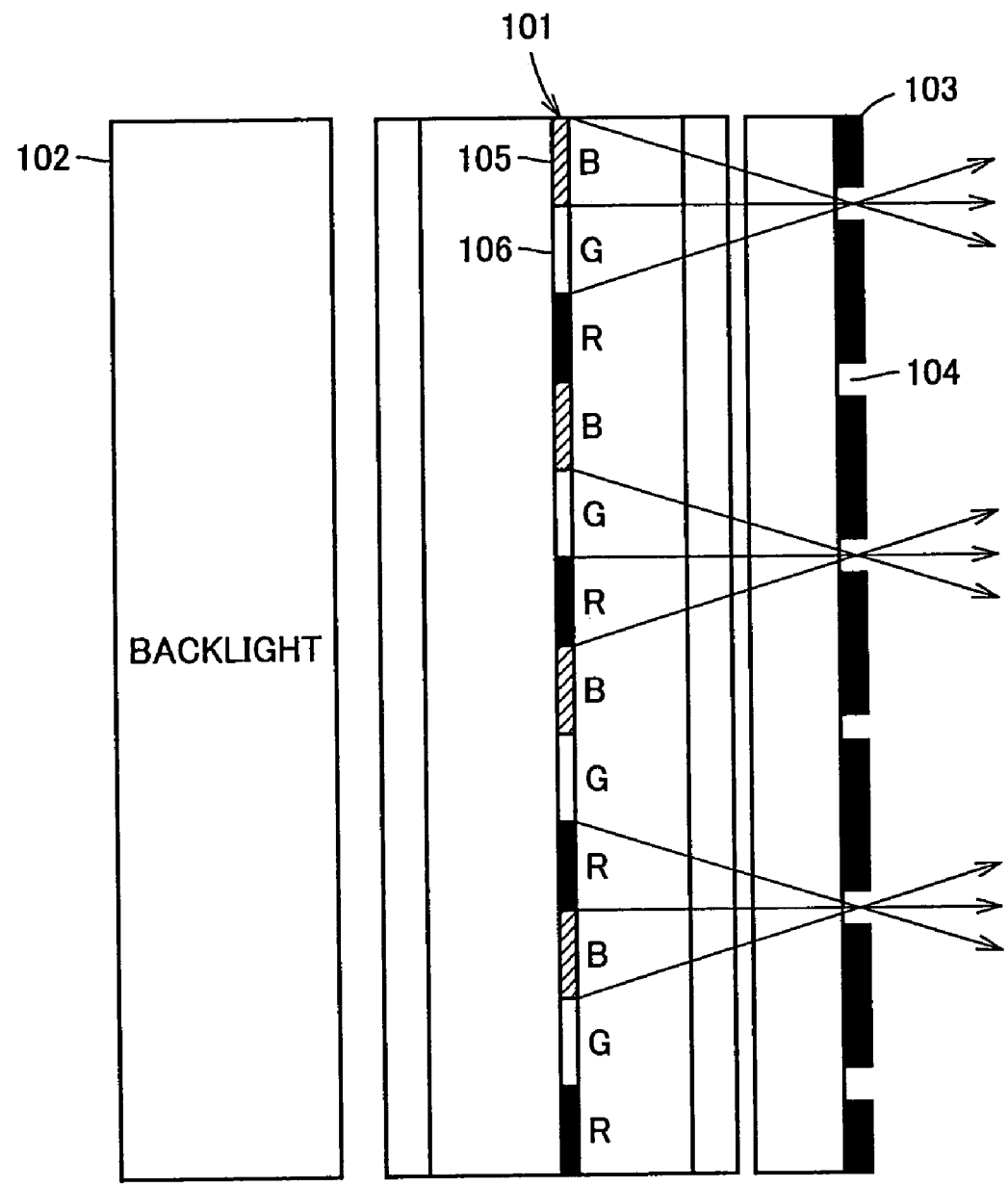
FIG. 10 is a cross sectional view showing an example of a configuration of a 3D display device.
Figure 11:
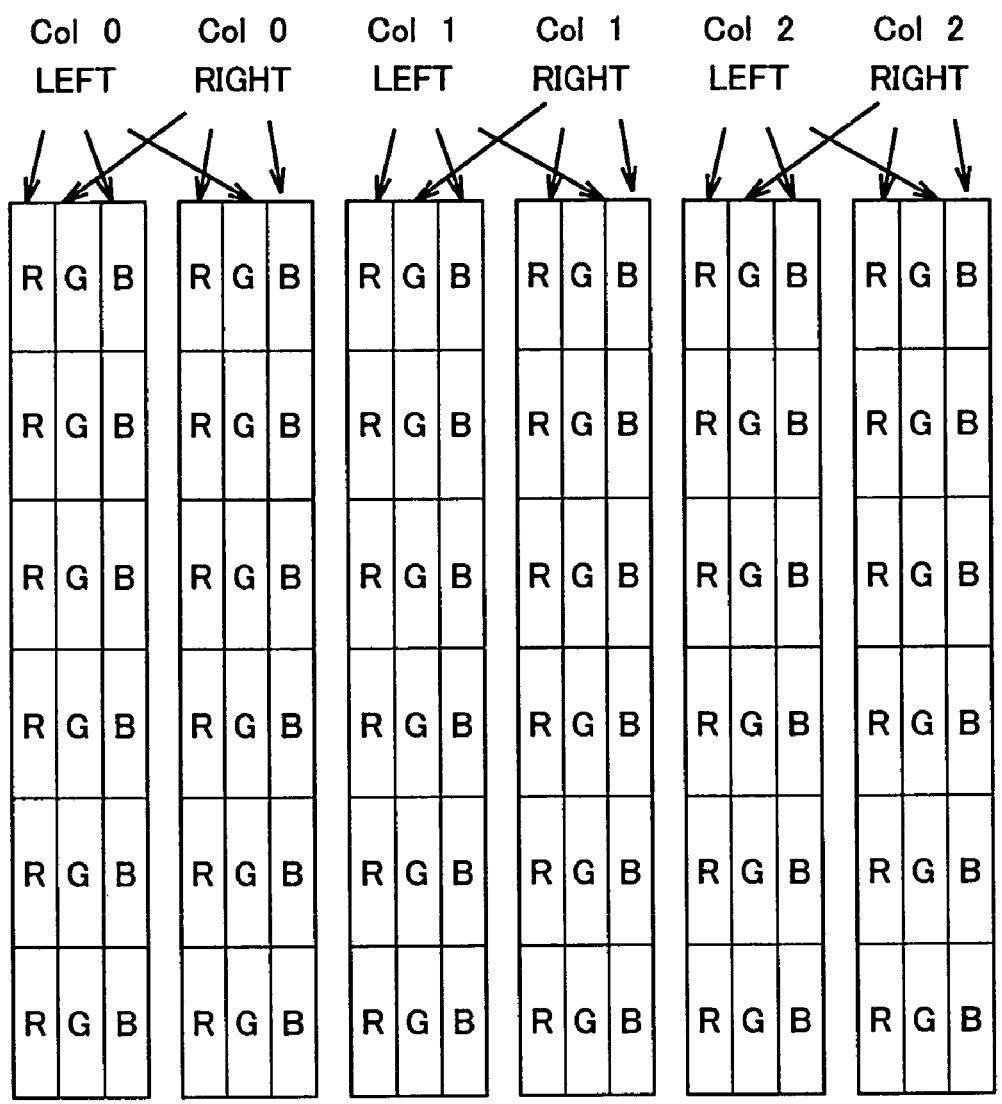
FIG. 11 shows a pixel layout illustrating replacement of pixels for the 3D display.

FIGS. 8A-8C show display examples being switched. Specifically, FIGS. 8A and 8B show display examples of 3D-image screen and 2D-image screen, respectively, on first display portion 5. FIG. 8C shows a display example of a 2D-image reception screen having a large number of characters displayed upon reception of a mail, for example.

Although the image data for the 3D-image display have been shared in the above embodiment, the image data for the 2D-image display may be shared instead. For example, it has been explained in the above embodiment that the 3D conversion function generating left-eye and right-eye image data from a camera image (of 2D-image data) is incorporated in mobile phone 1 so as to display the image picked up by camera portion 21 in a 3D image. When the screen is switched to the 3D-image display utilizing the incorporated 3D conversion function, data for the 3D-image display may be generated from the shared data for the 2D-image display.

Further, mobile phone 1 of the above embodiment is provided with the display device shown in FIG. 14 used as first display portion 5, and 2D/3D switching liquid crystal device 150 and patterning phase contrast plate 151 used as the liquid crystal device electrically selecting presence/absence of formation of the parallax optic. Alternatively, a liquid crystal device having a pair of polarizing plates may be used to form a display pattern which substantially functions as parallax barrier slits. In this case, 3D/2D switching is conducted in accordance with on/off of the display of the pattern.

Particularly in the former example, it is possible to readily form the parallax barrier slits with high precision, since they can be formed separately as the patterning phase contrast plate, irrelevant to formation of electrodes of the liquid crystal device. Thus, a 3D image of higher precision is achieved corresponding to the main displaying portion of higher precision (realizing highly precise 2D-image display), so that a higher-impact and interesting display can be achieved.

Although mobile camera phone 1 has been described above, the present invention is applicable to any mobile phone unprovided with a camera, as long as it includes a display portion on which 2D and 3D images are switched and displayed selectively.

Further, a mobile phone provided with a camera capable of picking up a 3D image may be used, in which case a user can take a picture while actually seeing the 3D image currently picked up by the camera and displayed on the display portion. Although a portable equipment having first and second housings 2 and 3 and configured to be foldable around hinge 4 has been described above, the equipment may have a single housing.

The present invention is applicable, not only to the mobile phone as the embodiment described above, but also to various kinds of electronic equipment including information equipment such as a portable terminal and a desktop personal computer, and audio/video equipment.

It is tiresome to see a stereoscopic 3D display in a running vehicle or continuously for a long time. Further, there are some who cannot make the 3D image in their heads by nature. According to the present invention, the parallax optic is not formed during the 2D-image display, as described above in detail. Thus, in the case where the 3D image is desired to be switched to the 2D image as described above, it is readily possible to display an easily viewable 2D-image screen on first display portion 5.

Further, sharing the 2D and 3D data facilitates display of an enjoyable 3D image. In addition, it is unnecessary to separately store data for the 2D-image screen.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic equipment, comprising:
    a display portion including a plurality of display elements and for switching and displaying a two-dimensional image and a three-dimensional image by selecting formation of a parallax optic; and
    a control portion for controlling a display on said display portion,
    said control portion instructing switching of the display between said two-dimensional image and said third-dimensional image involving said parallax optic, and generating a data for two-dimensional display and a data for three-dimensional display from a common data based on said instructing,
    wherein said display portion displays said two-dimensional image based on data for the display of a predetermined amount,
    data corresponding to said display elements include a first data for causing said parallax to exceed a predetermined parallax and second data for causing said parallax not to exceed said predetermined parallax, and
    said control portion generates a duplicate data by duplicating said first data on a predetermined basis, and generates said data for the display of said predetermined amount by combining said first data, said duplicate data and said second data.

2. The electronic equipment according to claim 1, wherein said display portion includes a liquid crystal device electrically selecting presence/absence of said parallax optic.

3. The electronic equipment according to claim 2, wherein said liquid crystal device includes a two-dimension/three-dimension switching liquid crystal device and a patterning phase contrast plate.

4. The electronic equipment according to claim 2, wherein said liquid crystal device includes a liquid crystal device selectively performing pattern display of a parallax barrier.

5. The electronic equipment according to claim 1, wherein
said common data includes image data corresponding to several views, and
said control portion generates said data for the two-dimensional display based on one of said image data corresponding to said several views.

6. The electronic equipment according to claim 5, wherein said display portion includes a liquid crystal device electrically selecting presence/absence of said parallax optic.

7. The electronic equipment according to claim 6, wherein said liquid crystal device includes a two-dimension/three-dimension switching liquid crystal device and a patterning phase contrast plate.

8. The electronic equipment according to claim 6, wherein said liquid crystal device includes a liquid crystal device selectively performing pattern display of a parallax barrier.

9. The electronic equipment according to claim 1, wherein
said common data includes image data corresponding to several views, and
said control portion generates said data for the two-dimensional display based on one of said image data corresponding to said several views extracted selectively.

10. The electronic equipment according to claim 9, wherein said display portion includes a liquid crystal device electrically selecting presence/absence of said parallax optic.

11. The electronic equipment according to claim 10, wherein said liquid crystal device includes a two-dimension/three-dimension switching liquid crystal device and a patterning phase contrast plate.

12. The electronic equipment according to claim 10, wherein said liquid crystal device includes a liquid crystal device selectively performing pattern display of a parallax barrier.

13. The electronic equipment according to claim 1, wherein
said common data includes image data representing a two-dimensional image,
said data for three-dimensional display includes image data corresponding to several views, and
said control portion generates said image data corresponding to said several views based on said image data representing the two-dimensional image.

14. The electronic equipment according to claim 13, wherein said display portion includes a liquid crystal device electrically selecting presence/absence of said parallax optic.

15. The electronic equipment according to claim 14, wherein said liquid crystal device includes a two-dimension/three-dimension switching liquid crystal device and a patterning phase contrast plate.

16. The electronic equipment according to claim 14, wherein said liquid crystal device includes a liquid crystal device selectively performing pattern display of a parallax barrier.

17. An electronic equipment, comprising:
a memory for storing a common data used commonly for display of a two-dimensional image and display of a three-dimensional image;
a display portion including a plurality of display elements and for displaying one of said two-dimensional image and said three-dimensional image by selectively forming a state where an optical parallax is generated;
a display control portion for controlling an operation of said display portion based on an input signal; and
a control portion for controlling said memory and an operation of said display control portion,
said control portion detecting an instruction to display one of said two-dimensional image and said three-dimensional image, generating a data for the display of said two-dimensional image and a data for the display of said three-dimensional image based on said common data read from said memory in accordance with said instruction, and outputting a command for enabling the display of one of said two-dimensional and three-dimensional images and said generated data for the display, to said display control portion,
wherein said display portion displays said two-dimensional image based on data for the display of a predetermined amount,
data corresponding to said display elements include a first data for causing said parallax to exceed a predetermined parallax and second data for causing said parallax not to exceed said predetermined parallax, and
said control portion generates a duplicate data by duplicating said first data on a predetermined basis, and generates said data for the display of said predetermined amount by combining said first data, said duplicate data and said second data.

18. The electronic equipment according to claim 17, wherein
said display portion includes
a plurality of display elements and
switching means for causing said optical parallax to be selectively generated with respect to images displayed by said plurality of display elements,
said two-dimensional image is displayed when said switching means attains a state where said optical parallax is not generated,
said common data includes data corresponding to at least left and right eye positions
said data corresponding to several views which correspond to respective said display elements, and
said control portion generates the data for the display of said two-dimensional image based on portions of said data corresponding to said several views read from said memory.

19. The electronic equipment according to claim 18, wherein
said display portion displays said two-dimensional image based on said data for the display of a predetermined amount, and
said control portion generates said data for the display of said predetermined amount by duplicating one of said data corresponding to said several views read from said memory.

* * * * *